United States Patent
Boocock et al.

(10) Patent No.: US 9,062,216 B2
(45) Date of Patent: Jun. 23, 2015

(54) PIGMENTS OF SIMULTANEOUSLY SUBSTITUTED PYROCHLORE AND RELATED STRUCTURES

(71) Applicant: The Shepherd Color Company, Cincinnati, OH (US)

(72) Inventors: Simon K. Boocock, Liberty Township, OH (US); Andrew E. Smith, Terrace Park, OH (US); Miroslav Trojan, Pardubice (CZ)

(73) Assignee: The Shepherd Color Company, Cincinnati, OH (US)

( * ) Notice: Subject to any disclaimer, the term of this patent is extended or adjusted under 35 U.S.C. 154(b) by 0 days.

(21) Appl. No.: 14/211,729

(22) Filed: Mar. 14, 2014

(65) Prior Publication Data

US 2014/0261085 A1    Sep. 18, 2014

Related U.S. Application Data

(60) Provisional application No. 61/782,987, filed on Mar. 14, 2013.

(51) Int. Cl.

| C09C 1/02 | (2006.01) |
| C09C 1/04 | (2006.01) |
| C09C 1/36 | (2006.01) |
| C09C 1/40 | (2006.01) |
| C09C 1/62 | (2006.01) |

(Continued)

(52) U.S. Cl.
CPC .......... *C09D 7/1216* (2013.01); *C01G 33/006* (2013.01); *C01G 41/006* (2013.01); *C01G 45/006* (2013.01); *C01G 45/12* (2013.01); *C01G 49/0054* (2013.01); *C01G 51/006* (2013.01); *C01G 51/40* (2013.01); *C01G 51/70* (2013.01); *C01G 53/006* (2013.01); *C01G 53/40* (2013.01); *C01G 53/70* (2013.01); *C01P 2002/36* (2013.01); *C01P 2002/52* (2013.01)

(58) Field of Classification Search
CPC .............. C09C 1/02; C09C 1/04; C09C 1/36; C09C 1/40; C09C 1/62
See application file for complete search history.

(56) References Cited

U.S. PATENT DOCUMENTS

| 6,582,814 B2 | 6/2003 | Swiler et al. |
| 7,326,370 B2 | 2/2008 | Barker et al. |

(Continued)

OTHER PUBLICATIONS

Kaufmann, K., "Synthetic and crystal-chemical analysis for the exploration of new color pigments", Dissertation, Saarbrucken, 2010. (German language with English Abstract).

(Continued)

*Primary Examiner* — Pegah Parvini
(74) *Attorney, Agent, or Firm* — Frost Brown Todd LLC

(57) ABSTRACT

A compound or a pigment comprising a compound where there is simultaneous substitution of more or more elements onto both the A and B sites of a pyrochlore lattice or a lattice related to a pyrochlore. The pigment comprises a compound with the formula of $A_yA'_yB_xB'_xZ_p$. Elements A and A' have a valence of 1, 2, or 3; and are selected from the elements of groups 1, 2, 12, 13, 14, 15, and the first row of transition metals, excluding H, Pb, Cd, Hg, N, As, and Tl. Elements B and B' have a valence of 3, 4, 5, or 6; and are selected from the elements of the first, second, or third row of transition metals, groups 13, 14, and 15, excluding V, C, Pb, and Tl. Element Z is selected from O, F, N, a chalcogen, S, Se, hydroxide ion, and mixtures thereof.

18 Claims, 1 Drawing Sheet

A at 16d
O' at 8b
8a site
O at 48f
B at 16c

(51) Int. Cl.

| | |
|---|---|
| *C09D 7/12* | (2006.01) |
| *C01G 33/00* | (2006.01) |
| *C01G 41/00* | (2006.01) |
| *C01G 45/00* | (2006.01) |
| *C01G 45/12* | (2006.01) |
| *C01G 49/00* | (2006.01) |
| *C01G 51/00* | (2006.01) |
| *C01G 53/00* | (2006.01) |

(56) References Cited

U.S. PATENT DOCUMENTS

| | | |
|---|---|---|
| 7,594,961 B2 | 9/2009 | Booth et al. |
| 8,192,541 B2 | 6/2012 | Boocock |
| 8,278,232 B2 | 10/2012 | Malow et al. |
| 8,329,129 B2 | 12/2012 | Sato et al. |

OTHER PUBLICATIONS

O'Brien, D.L.J., "Preparation of Environmentally-Friendly Inorganic Pigments", Thesis, Loughborough University, 2005.

International Search Report and Written Opinion dated Oct. 21, 2014 for Application No. PCT/US2014/026066.

Pailhé, N., et al., ($Ca^2$, $V^{5+}$) co-doped $Y_2Ti_2O_2$ yellow pigment), Materials Research Bulletin, 2009, 44:1771-1777.

Pavlov, R.S., et al., "New Red-Shade Ceramic Pigments Based on $Y_2Sn_{2-x}Cr_xO_{7-\delta}$ Pyrochlore Solid Solutions", J. Am. Ceram. Soc. 85 [5] 1197-202 (2002).

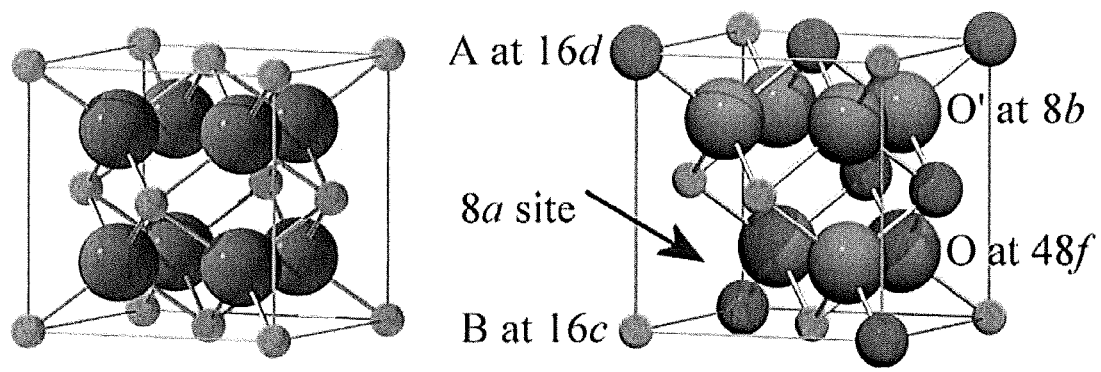

PIGMENTS OF SIMULTANEOUSLY SUBSTITUTED PYROCHLORE AND RELATED STRUCTURES

BACKGROUND

Pyrochlore compounds have, until recently, been little explored for use as pigments. Lead antimonate pyrochlore (C.I. Pigment Yellow 41) was used for many years as a pigment with high yellow color in ceramic bodies, some glazes, glass enamels and even in artists colors. The use of lead antimonate pyrochlore diminished for two reasons: first, the pigment contains lead, which precludes its use in many decorative articles; second, technically superior alternatives arose for many applications.

Specific mixtures of rare earth oxides and vanadium oxides, often modified through substitution of alkali earth may be potential ceramic colorants. U.S. Pat. No. 6,582,814, describes examples of rare earth titanates which clearly belong in the pyrochlore class, though none are of high chroma and are thus of limited commercial value.

BRIEF SUMMARY

This disclosure relates to a compound or a pigment comprising a compound where there is simultaneous substitution of more or more elements onto both the A and B sites of a pyrochlore lattice or a lattice related to a pyrochlore.

A pigment comprises a compound with the formula of $A_yA'_{y'}B_xB'_{x'}Z_p$; wherein:

$1.5 \le y+y' \le 2.5$; $0.5 \le y \le 2$; $0.5 \le y' \le 2$; and $y > y'$;

$1.5 \le x+x' \le 2.5$; $0.5 \le x \le 2$; $0.5 \le x' \le 2$; and $x > x'$;

$5 \le p \le 9$;

A and A' are elements having a valence of 1, 2, or 3, selected from the elements of groups 1, 2, 12, 13, 14, 15, and the first row of transition metals, excluding H, Pb, Cd, Hg, N, As, and Tl; A≠A';

B and B' are elements having a valence of 3, 4, 5, or 6, selected from the elements of the first, second, or third row of transition metals, groups 13, 14, and 15, excluding V, C, Pb, and Tl; B≠B';

Z is selected from O, F, N, a chalcogen, S, Se, hydroxide ion, and mixtures thereof.

A compound with the formula of $A_yA'_{y'}B_xB'_{x'}Z_p$; wherein:

$0.5 \le y+y' \le 2$, and $y > y'$;

$0.5 \le x+x' \le 2$, and $x > x'$;

$5 \le p \le 9$;

A and A' are elements having a valence of 1, 2, or 3, selected from the elements of groups 1, 2, 12, 13, 14, 15, and the first row of transition metals, excluding H; A≠A';

B and B' are selected from are elements having a valence of 3, 4, 5, or 6, selected from the elements of the first, second, or third row of transition metals, groups 13, 14, and 15, excluding V, C, Pb, and Tl; B≠B';

wherein either A comprises at least one of Al or boron, or B comprises P;

Z is selected from O, F, N, a chalcogen, S, Se, hydroxide ion, and mixtures thereof.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

FIG. 1 shows a unit cell of a fluorite lattice, left and of a pyrochlore lattice, right. Small and medium spheres represent cations with higher and lower valence respectively. Large spheres represent the anion, generally $O^{2-}$. The arrow indicates the anion site vacancy.

DETAILED DESCRIPTION

The term 'pyrochlore' refers to a class of materials of the general formula $A_2B_2X_7$ which is isostructural to the mineral pyrochlore (NaCa)(NbTa)$O_6$F/(OH). The ideal pyrochlore structure is a cubic Fd-3m lattice where A is generally a large and low valent cation ($M^{1+,2+,3+}$), B is a small and high valent cation ($M^{3+,4+,5+,6+}$). Oxygen is a common anion. The formula is often written as $A_2B_2O_6O'$ as the pyrochlore structure can be split into a $B_2O_6$ framework with an interpenetrating sub-lattice of $A_2O'$.

The structure closely resembles the fluorite structure, $CaF_2$, as an extended defect version. FIG. 1 shows the fluorite structure on the left, and the pyrochlore structure on the right. The pyrochlore, in comparison, has 2 cation sites vacant, and ⅛ anion sites vacant. Small and medium spheres represent cations with higher and lower valence respectively. Large spheres represent the anion, generally $O^{2-}$. The arrow indicates the anion site vacancy.

The $B_2O_6$ framework is made up of corner shared $BO_6$ octahedra, whereas the $A_2O'$ sub-lattice can be described as an $AO_8$ scalenohedral network. The flexibility of the pyrochlore lattice allows for the synthesis of a large number of materials containing a large variety of elements with a large range of oxidation states. In addition, the lattice also allows for defects often resulting in the formula $AB_2O_6$ where half of the A cation sites are vacant, and all of the O' anion sites are vacant. These defects and interlocking lattices extend the potential multiple site occupations possible, and make the general class of pyrochlores, with and without defects, useful as potential pigments.

Synthetic Methods:

Compounds may be synthesized by heating an intimate, intensively blended mixture of metal oxides, carbonates, salts, and chalcogenides, at elevated temperatures ranging from 500° C. to 1300° C., sometimes various atmospheres, such as air or inert atmospheres. Elevated temperatures are employed to achieve faster rates of reactions, which in polycrystalline materials, is limited by ion diffusion.

Alternatively, compounds may be prepared wet chemistry methods such as precipitation and ion exchange. In precipitation reactions, aqueous solutions of metal halides or nitrates are mixed with aqueous solutions of alkaline metal acids to form a solid pyrochlore-type material. The precipitation is controlled by the selected metal precursors, pH, solution concentrations, and temperature. This material may or may not be subjected to additional calcination steps of 200° C.-1100° C.

Ion exchange reactions utilize hydrous, or pre-calcined pyrochlore type materials. The solid pyrochlore type material is immersed in an acidic metal halide, or metal sulphate solution, and heated at low temperatures while continuously mixing. The rate of the exchange reaction, approximately 1 hour to 1 day, is controlled by the pH, metal precursors, solution concentration, and temperature. The solid material is then repeatedly washed, dried, and in some cases calcined at temperatures ranging from 200° C.-1100° C.

Predicted Stability Range of Pyrochlores:

Empirical rules have been developed, based on atomic radii and coordination number, to describe the range of possible binary combinations of divalent with pentavalent and trivalent with tetravalent metal ions which would comprise an $A_2B_2O_7$ pyrochlore.

The stability range of pyrochlore has been defined in two general ways. First, the ratio of radius of the "A" and "B" atoms to one another has been used by Subramanian to define stability of binary 3:4 and 2:5 pyrochlores. Secondly, tolerance factors, which also accounts for the oxygen or chalcogen radius, can be calculated. For 3:4 pyrochlores a stability range for Ra/Rb is 1.40<Ra/R<1.80; in the case of 2:5 pyrochlores this expands to 1.46<Ra/Rb<12. The utility of tolerance factors have been examined for the larger class of 3:4 pyrochlores, and the expected range of tolerance for simple cases of 3:4 pyrochlores is as given in equation 1.

$$t = \frac{10\sqrt{3}\,(R_B + R_O)}{8[R_A + (\sqrt{3}+1)R_O]}$$

Equation 1

For ideal Fd-3m pyrochlores of the binary $M(III)_2M(IV)_2O_7$ class, when Ra/Rb is between 1.4 and 1.8 and tolerance factor is between 0.925 and 1.05, the stability is predicted to be high. What has surprisingly been found are compositions with pyrochlore or pyrochlore related structures that are stable despite the fact that they do not fall within the predicted stability zone, often these are accessible with significant deviations from ideal $A_2B_2X_7$ stoichiometry. These structures can include B, Al, or P.

In some embodiments, a pigments comprises a compound with the formula of $A_yA'_{y'}B_xB'_{x'}Z_p$. The values for y, y', x, x', and p satisfy the equations:

1.5≤y+y'≤2.5; 0.5≤y≤2; 0.5≤y'≤2; and y>y';

1.5≤x+x'≤2.5; 0.5≤x≤2; 0.5≤x'≤2; and x>x';

5≤p≤9.

Elements A and A' have a valence of 1, 2, or 3; and are selected from the elements of groups 1, 2, 12, 13, 14, 15, and the first row of transition metals, excluding H, Pb, Cd, Hg, N, As, and Tl. A is not the same as A'. However, A and A' may both be the same element if they have different formal charges. Elements B and B' have a valence of 3, 4, 5, or 6; and are selected from the elements of the first, second, or third row of transition metals, groups 13, 14, and 15, excluding V, C, Pb, and Tl. B is not the same as B'. However, B and B' may both be the same element if they have different formal charges. Element Z is selected from O, F, N, a chalcogen, S, Se, hydroxide ion, and mixtures thereof.

In some embodiments, the compounds has the formula of $A_yA'_{y'}B_xB'_{x'}Z_p$. The values for y, y', x, x', and p satisfy the equations:

0.5≤y+y'≤2, and y>y';

0.5≤x+x'≤2, and x>x';

5≤p≤9.

Elements A and A' have a valence of 1, 2, or 3; and are selected from the elements of groups 1, 2, 12, 13, 14, 15, and the first row of transition metals, excluding H. A is not the same as A'. However, A and A' may both be the same element if they have different formal charges. B and B' are selected from elements having a valence of 3, 4, 5, or 6, selected from the elements of the first, second, or third row of transition metals, group 13, 14, and 15, excluding V, C, Pb, and Tl. Elements A and B are selected so that either A comprises at least one of Al or boron, or B comprises P. B is not the same as B'. However, B and B' may both be the same element if they have different formal charges. Element Z is selected from O, F, N, a chalcogen, S, Se, hydroxide ion, and mixtures thereof. In some embodiments, A is selected from a rare earth metal or mixtures thereof. Examples of rare earth metals include, Sc, Y, La, Ce, Pr, Nd, Pm, Sm Eu, Gd, Tb, Dy, Ho, Er, Tm, Yb, and Lu.

In some embodiments, A is selected from Sn, Zn, boron, and Al.

In some embodiments, B and B' are selected from Sb, Nb, Ta, P, Sn, Ti, Zr, Hf, W, Mo, and mixtures thereof.

The formal charge on elements A and B may vary, such as the formal charge on A is +2, and the formal charge on B is +5, or the formal charge on A is +3, and the formal charge on B is +4.

While this disclosure primarily discusses the pyrochlore structure, the compound may be in several possible structures, such as a pyrochlore, fluorite, or weberite structures.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

A mixture of titanium dioxide, stannous oxide, stannic oxide, niobium oxide and zinc sulfide in mass proportions of 19:44:6.5:26:4.5 was made using a Waring blender. The resulting homogenous blend was calcined under flowing inert gas at a temperature between 800° C. and 1000° C. The resulting product, following comminution with 0.7-mm zirconia media in water, was a very bright yellow powder having excellent pigmentary value. The approximate molecular formula of the resulting pigment was:

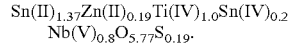
$Sn(II)_{1.37}Zn(II)_{0.19}Ti(IV)_{1.0}Sn(IV)_{0.2}$
$Nb(V)_{0.8}O_{5.77}S_{0.19}$.

Example 2

A mixture of aluminum oxide, niobium oxide, stannous oxide and stannic oxide and zinc sulfide in proportions of 16:42:30.5:9.5:2 was made using a Waring blender. The resulting homogenous blend was calcined under flowing inert gas at a temperature between 800° C. and 1000° C. The resulting product, following comminution with 0.7-mm zirconia media in water, was a bright yellow-orange powder having excellent pigmentary value.

Example 3

A mixture of aluminum oxide, niobium oxide, stannous oxide and stannic oxide in proportions of 16:41:33.5:9.5 was made using a Waring blender. The resulting homogenous blend was calcined under flowing inert gas at a temperature between 800° C. and 1000° C. The resulting product, following comminution with 0.7-mm zirconia media in water, was a bright yellow powder having excellent pigmentary value.

Example 4

After milling to a d50 of <0.8 micron the products from examples 1, 2 and 3 were incorporated into an acrylic paint. Color was compared in masstone and letdown (4:1 with titanium dioxide) with that obtained using a pyrochlore pigment made in accordance with U.S. Pat. No. 8,192,541, sold as YL10C151 by the Shepherd Color Company. The procedure is described in U.S. Pat. No. 8,192,541, example 10. The resulting color coordinates are shown in Tables 1 and 2.

and dried in an oven at 90° C. The resulting powder was a uniform yellow colored powder.

Example 7

An intimate mixture of $K_2CO_3$, $Ta_2O_3$, and $WO_3$ was made using an intensive blending mixture in molar ratios of 1:1:2 to 3:3:1 The raw batch was loaded into an open top alumina boat and fired in air at 550 C. for several hours and then at 850 C. The resulting white product was then ground to a reduced particle size in a $Sn^{2+}$ solution. The resulting slurry was then placed in an excess of a $Sn^{2+}$ solution and magnetically stirred at room temperature for several hours. The slurry was then

TABLE 1

Masstone

| Name | L* | a* | b* | C* | h° | | | | | |
|---|---|---|---|---|---|---|---|---|---|---|
| YL10C151 | 77.45 | 21.07 | 76.47 | 79.32 | 74.59 | | | | | |
| Name | ΔL* | Δa* | Δb* | ΔE* | % STR-WSUM | L* | a* | b* | C* | h° |
| Example 1 | −4.92 | 0.59 | −7.56 | 9.04 | 101.49 | 72.54 | 21.66 | 68.90 | 72.23 | 72.55 |
| Example 2 | 3.04 | −5.58 | 5.37 | 8.32 | 100.89 | 80.50 | 15.50 | 81.84 | 83.29 | 79.28 |
| Example 3 | 5.58 | −10.17 | −5.41 | 7.35 | 109.72 | 83.03 | 10.90 | 84.34 | 85.04 | 82.64 |

TABLE 2

Letdown

| Name | L* | a* | b* | C* | h° | | | | | |
|---|---|---|---|---|---|---|---|---|---|---|
| YL10C151 | 87.15 | 9.27 | 43.79 | 44.76 | 78.05 | | | | | |
| Name | ΔL* | Δa* | Δb* | ΔE* | % STR-WSUM | L* | a* | b* | C* | h° |
| Example 1 | −4.25 | 2.96 | 0.23 | 5.19 | 139.06 | 82.90 | 12.23 | 44.02 | 45.69 | 74.47 |
| Example 2 | 4.79 | −8.22 | −4.48 | 10.51 | 55.70 | 91.94 | 1.05 | 39.31 | 39.32 | 88.47 |
| Example 3 | 3.64 | −5.66 | −5.60 | 8.75 | 58.31 | 90.79 | 3.60 | 38.19 | 38.36 | 84.61 |

Example 5

An intimate mixture of $K_2CO_3$, $Sb_2O_3$, and $WO_3$ was made using an intensive blending mixture in molar ratios of 1:1:2 to 3:3:1 The raw batch was loaded into an open top alumina boat and fired in air at 550° C. for several hours and then at 850° C. The resulting white product was then ground to a reduced particle size in a $Sn^{2+}$ solution. The resulting slurry was then placed in an excess of a $Sn^{2+}$ solution and magnetically stirred at room temperature for several hours. The slurry was then filtered, washed with deionized water, and dried in an oven at 90° C. The resulting powder was a uniform yellow colored powder.

Example 6

An intimate mixture of $K_2CO_3$, $Nb_2O_3$, and $WO_3$ was made using an intensive blending mixture in molar ratios of 1:1:2 to 3:3:1 The raw batch was loaded into an open top alumina boat and fired in air at 550° C. for several hours and then at 850° C. The resulting white product was then ground to a reduced particle size in a $Sn^{2+}$ solution. The resulting slurry was then placed in an excess of a $Sn^{2+}$ solution and magnetically stirred at room temperature for several hours. The slurry was then filtered, washed with deionized water, filtered, washed with deionized water, and dried in an oven at 90° C. The resulting powder is a uniform yellow-green colored powder.

Example 8

An intimate mixture of $K_2CO_3$, $Sb_2O_3$, $Nb_2O_5$, and $WO_3$ was made using an intensive blending mixture in molar ratios of 1:0.5:0.5:2 to 3:1.5:1.5:1 The raw batch was loaded into an open top alumina boat and fired in air at 550° C. for several hours and then at 850° C. The resulting white product was then ground to a reduced particle size in a $Sn^{2+}$ solution. The resulting slurry was then placed in an excess of a $Sn^{2+}$ solution and magnetically stirred at room temperature for several hours. The slurry was then filtered, washed with deionized water, and dried in an oven at 90° C. The resulting powder was a uniform yellow colored powder.

Example 9

An intimate mixture of $K_2CO_3$, $Al(OH)_3$, and $WO_3$ was made using an intensive blending mixture in molar ratios of 3:1:5. The raw batch was loaded into an open top alumina boat and fired in air at 350° C. for several hours and then at 750° C. The resulting light yellow product was then ground to a reduced particle size. The resulting powder was then placed in an excess of a $Sn^{2+}$ solution and magnetically stirred at room temperature for several hours. The resulting yellow-green powder was then filtered, washed with deionized water, and dried in an oven at 90° C.

Example 10

An intimate mixture of $K_2CO_3$, $TiO_2$, and $WO_3$ was made using an intensive blending mixture in molar ratios of 2:1:3. The raw batch was loaded into an open top alumina boat and fired in air at 350° C. for several hours and then at 750° C. The resulting light yellow product was then ground to a reduced particle size. The resulting powder was then placed in an excess of a $Sn^{2+}$ solution and magnetically stirred at room temperature for several hours. The resulting green powder was then filtered, washed with deionized water, and dried in an oven at 90° C.

Example 11

An intimate mixture of $K_2CO_3$, $TiO_2$, and $WO_3$ was made using an intensive blending mixture in molar ratios of 2:1:3. The raw batch was loaded into an open top alumina boat and fired in air at 350° C. for several hours and then at 750° C. The resulting light yellow product was then ground to a reduced particle size. The resulting powder was then placed in an excess of a $Co^{2+}$ solution and magnetically stirred at room temperature for several hours. The resulting light purple powder was then filtered, washed with deionized water, and dried in an oven at 90° C.

Example 12

An intimate mixture of $K_2CO_3$, $Al(OH)_3$, and $WO_3$ was made using an intensive blending mixture in molar ratios of 3:1:5. The raw batch was loaded into an open top alumina boat and fired in air at 350° C. for several hours and then at 750° C. The resulting light yellow product was then ground to a reduced particle size. The resulting powder was then placed in an excess of a $Co^{2+}$ solution and magnetically stirred at room temperature for several hours. The resulting light turquoise powder was then filtered, washed with deionized water, and dried in an oven at 90° C.

Example 13

After milling to a d50 of less than 1 micron, the products of examples 1, 2, 3, 4, 5 and 6 were incorporated into an acrylic paint. Color was compared in masstone with that obtained using a pyrochlore pigment made in accordance with U.S. Pat. No. 8,192,541, sold as YL10C151 by the Shepherd Color Company. The procedure is described in U.S. Pat. No. 8,192,541, example 10. The resulting color coordinates are shown in Table 3.

TABLE 3

| Masstone | | | | | | | | | |
|---|---|---|---|---|---|---|---|---|---|
| Name | L* | a* | b* | C* | h° | | | | |
| YL10C151 | 77.46 | 21.63 | 77.55 | 80.51 | 74.42 | | | | |
| Name | ΔL* | Δa* | Δb* | ΔE* | % STR-WSUM | L* | a* | b* | C* | h° |
| Example 5 | −1.87 | −3.69 | −19.05 | 19.49 | 54.79 | 75.59 | 17.94 | 58.51 | 61.20 | 72.95 |
| Example 6 | 0.60 | −8.10 | −14.78 | 16.87 | 55.69 | 78.06 | 13.52 | 62.77 | 64.21 | 77.84 |
| Example 7 | 5.68 | −14.58 | −16.87 | 23.00 | 38.00 | 83.14 | 7.05 | 60.69 | 61.10 | 83.37 |
| Example 8 | 1.91 | −10.05 | −19.14 | 21.70 | 44.06 | 79.37 | 11.57 | 58.42 | 59.55 | 78.79 |
| Example 9 | −2.08 | −13.26 | −20.28 | 24.32 | 55.54 | 75.38 | 8.37 | 57.27 | 57.88 | 81.69 |
| Example 10 | −3.48 | −12.38 | −21.70 | 25.22 | 56.72 | 73.98 | 9.25 | 55.85 | 56.61 | 80.59 |

Examples 14-19

Stannous, stannic, titanium, tungsten and aluminum oxides in various proportions shown in table 4, were intimately mixed in a Waring blender along with specific amounts of either sodium carbonate or zinc oxide.

TABLE 4

| | 14 | 15 | 16 | 17 | 18 | 19 |
|---|---|---|---|---|---|---|
| SnO | 38.26 | 37.26 | 36.26 | 36.26 | 34.26 | 32.26 |
| $SnO_2$ | 5.73 | 5.73 | 5.73 | 5.73 | 5.73 | 5.73 |
| $TiO_2$ | 16.93 | 16.93 | 16.93 | 16.93 | 16.93 | 16.93 |
| $WO_3$ | 34.78 | 34.78 | 34.78 | 34.78 | 34.78 | 34.78 |
| $Al_2O_3$ | 12.75 | 12.75 | 12.75 | 12.75 | 12.75 | 12.75 |
| $Na_2CO_3$ | | 0.79 | 1.57 | | | |
| ZnO | | | | 1.21 | 2.42 | 3.62 |

The resulting mixtures were calcined under flowing inert gas at 800° C., the products yielded were deep burgundy red in color. Powder X-ray diffraction patterns show the resulting products to adopt the $Sn_2TiWO_7$ phase.

Examples 20-21

The products from examples 14 and 15 were thermally annealed in air at 470° C. The intrinsic color of the product remained a burgundy red, though it was substantially brightened.

Examples 22-24

The products from examples 17 to 19 are thermally annealed in air at 500° C., intrinsic color remains a burgundy red, but is substantially brighter. Color results for examples 14 through 19 and 22 through 24 are shown below in Table 5.

TABLE 5

| | Masstone | | | | | Tint | | | | |
|---|---|---|---|---|---|---|---|---|---|---|
| Example | L* | a* | b* | C* | h° | L* | a* | b* | C* | h° |
| 14 | 35.28 | 19.43 | 12.77 | 23.25 | 33.31 | 63.39 | 10.63 | -1.33 | 10.72 | 352.9 |
| 15 | 34.08 | 17.73 | 10.58 | 20.65 | 30.81 | 64.49 | 9.2 | -2.68 | 9.58 | 343.7 |
| 16 | 33.11 | 17.64 | 9.56 | 20.07 | 28.44 | 66.99 | 8.3 | -3.22 | 8.9 | 338.8 |
| 17 | 36.82 | 20.96 | 14.81 | 25.66 | 35.24 | 63.81 | 12.64 | 1.21 | 12.7 | 5.48 |
| 18 | 37.61 | 22.05 | 15.42 | 26.9 | 34.96 | 64.83 | 13.18 | 1.45 | 13.26 | 6.28 |
| 19 | 38.17 | 22.83 | 16.07 | 27.92 | 35.14 | 65.72 | 13.48 | 1.82 | 13.6 | 7.7 |
| 22 | 37.63 | 24.77 | 18.02 | 30.63 | 36.04 | 66.87 | 14.34 | 3.02 | 14.65 | 11.91 |
| 23 | 39.17 | 26.78 | 20.12 | 33.5 | 36.91 | 67.62 | 15.34 | 3.94 | 15.84 | 14.4 |
| 24 | 41.03 | 28.65 | 21.75 | 35.97 | 37.2 | 68.68 | 16.36 | 4.85 | 17.06 | 16.53 |

Examples 25-36

Lanthanum, stannous, niobium, titanium and zinc oxides in various proportions were intimately mixed using a Waring blender then fired at temperatures within the range 1500° F. to 1800° F. in an atmosphere of flowing inert gas. The blends for examples 25, 27, 28 and 29 also incorporated potassium carbonate as a source of potassium oxide in the fired product. Examples 34 through 36 feature substitution of samarium oxide in lieu of an equimolar quantity of lanthanum oxide. The resulting products were yellow to golden-yellow compounds. The dominant structure exhibited was, generally, that of pyrochlore, though examples prepared well outside electrical balance for a (A,A'):(B,B') pyrochlore may exhibit trace phases such as $LaNbO_4$. Molar proportions are shown in Table 6.

TABLE 6

| Component Oxides | 25 | 26 | 27 | 28 | 29 | 30 | 31 | 32 | 33 | 34 | 35 | 36 |
|---|---|---|---|---|---|---|---|---|---|---|---|---|
| $K_2O$ | 0.25 | 0 | 0.25 | 0.25 | 0 | 0.25 | 0 | | | | | |
| CaO | 0 | 0 | 0 | | | | | | | | | |
| $Nb_2O_5$ | 1.5 | 1 | 1.25 | 1.3 | 1.3 | 1.15 | 1.4 | 1.1 | 1.35 | 1.4 | 1.1 | 1.35 |
| SnO | 1.5 | 1.9 | 1.9 | 1.5 | 1.9 | 1.9 | 2.1 | 1.9 | 1.9 | 2.1 | 1.9 | 1.9 |
| $TiO_2$ | | | | 0.2 | 0.2 | 0.2 | 0.2 | 0.4 | 0.3 | 0.2 | 0.4 | 0.3 |
| $La_2O_3$ | 0.25 | 0 | 0.25 | 0.45 | 0.2 | 0.45 | 0.45 | 0.2 | 0.55 | | | |
| $Sm_2O_3$ | | | | | | | | | | 0.45 | 0.2 | 0.55 |
| ZnO | | 0.1 | 0.1 | | | | | | | | | |
| (A, A') | 2.25 | 2 | 2.75 | 2.65 | 2.3 | 3.05 | 3 | 2.3 | 3 | 2.55 | 2.1 | 2.45 |
| (B, B') | 3 | 2 | 2.5 | 2.8 | 2.8 | 2.5 | 3 | 2.6 | 3 | 3 | 2.6 | 3 |

Example 37

After grinding to sub-micron particle size, the resulting powders from examples 25 through 36 were incorporated into an acrylic enamel and color determined in masstone and tint as described in U.S. Pat. No. 8,192,541, example 10. A subset of these results are shown in Table 7 versus a typical niobium tin zinc pyrochlore yellow, sold by Shepherd Color Company as YL10C151.

TABLE 7

Masstone color for Example 37

| Control | L* | a* | b* | ill-obs | | | | h° | C* |
|---|---|---|---|---|---|---|---|---|---|
| YL10C151 | 77.47 | 21.65 | 78.03 | D65-10 | | | | 74.5 | 80.97 |

| Example | L* | a* | b* | DL* | Da* | Db* | DE* | h° | C* |
|---|---|---|---|---|---|---|---|---|---|
| 25 | 80.56 | 15.18 | 81.79 | 3.09 | -6.47 | 3.76 | 8.1 | 79.49 | 83.19 |
| 26 | 79.65 | 14.12 | 81.41 | 2.18 | -7.53 | 3.38 | 8.53 | 80.16 | 82.62 |

TABLE 7-continued

Masstone color for Example 37

| | | | | | | | | |
|---|---|---|---|---|---|---|---|---|
| 27 | 80.46 | 5.58 | 74.65 | 2.99 | −16.06 | −3.38 | 16.68 | 85.72 | 74.86 |
| 29 | 75.05 | 21.13 | 77.21 | −2.42 | −0.52 | −0.82 | 2.6 | 74.7 | 80.05 |
| 34 | 73.04 | 22.61 | 73.8 | −4.43 | 0.96 | −4.23 | 6.2 | 72.97 | 77.18 |
| 35 | 76.79 | 21.63 | 78.19 | −0.68 | −0.02 | 0.16 | 0.7 | 74.54 | 81.13 |
| 36 | 75.24 | 20.6 | 75.51 | −2.23 | −1.05 | −2.52 | 3.52 | 74.74 | 78.27 |

Tint strength in these samples generally varies in proportion to the tin content, as suggested by data shown in Table 8, but in masstone perceived chroma and hue is not directly correlated to either tin or niobium content. Thus these examples provide commercially attractive means to lower costs through substitution for niobium on the "B" site of this multiply substituted $A_2B_2$ pyrochlore.

TABLE 8

Tint strength vs. Niobium and Tin Content from Example 37

| Sample | SnO % | Sn vs Control | Nb2O5 % | Tint STR - % |
|---|---|---|---|---|
| Control Trials | 46% | 100% | 50.4% | 100 |
| 25 | 28% | 61% | 56% | 41 |
| 26 | 48% | 104% | 50% | 75 |
| 27 | 36% | 78% | 47% | 66 |
| 29 | 37% | 80% | 51% | 72 |
| 34 | 31% | 67% | 44% | 63 |
| 35 | 34% | 74% | 45% | 68 |
| 36 | 31% | 67% | 43% | 60 |

Examples 38-40

Mixtures of stannous oxide, niobium pentoxide, stannous pyrophosphate and either zinc oxide or zinc sulfide in various proportions, close to those for making an electrically neutral pyrochlore, were intimately mixed using a Waring blender then fired at temperatures within the range 1350° F. to 1700° F. under flowing argon. The resulting products, after milling, were deeply orange-toned yellow powders exhibiting the pyrochlore structure. Example 38 was made to normal ratios for the commercial YL10C151. Examples 39 and 40 exhibit effects of 10-mol % substitution of stannous pyrophosphate for niobium oxide and stannous oxide simultaneously. Introduction of stannous pyrophosphate into the raw batch significantly lowers firing temperature and greatly increases the redness of the fired product, even after grinding to about 1 micron d50.

Examples 41

The products from examples 38 through 40 were subjected to color analysis as described in U.S. Pat. No. 8,192,541, example 10. The results are exhibited in Table 9.

TABLE 9

Masstone and Tint Color Data for Example 41

| Masstone Example | L* | a* | b* | C* | h° | |
|---|---|---|---|---|---|---|
| 38 | 76.42 | 19.24 | 74.87 | 77.3 | 75.59 | |
| 39 | 69.56 | 28.55 | 66.12 | 72.02 | 66.65 | |
| 40 | 68.88 | 28.56 | 66.75 | 72.6 | 66.84 | |
| Tint Example | L* | a* | b* | C* | h° | d50 |
| 38 | 86.57 | 8.48 | 44.94 | 45.73 | 79.32 | 0.9 |
| 39 | 85.96 | 11.83 | 27.13 | 29.6 | 66.45 | 1.74 |
| 40 | 84.04 | 13.55 | 32.05 | 34.8 | 67.09 | 1.11 |

Examples 42-52

Mixtures of bismuth oxide, niobium pentoxide, antimony oxide, and iron oxide in various proportions, close to those for making an electrically neutral pyrochlore, were intimately mixed using a Waring blender then fired, in air, at temperatures within the range of 1350° F. to 1700° F. The resulting products, after milling, exhibited a range of colors from very deep orange-brown to light orange; the dominant or sole phase observed in their x-ray powder diffraction patterns was that of a pyrochlore. Color is deeper and richer in hue as Bismuth content increases. Masses of oxides are used in these examples are shown in table 10.

Examples 53-54

Mixtures of bismuth oxide, niobium pentoxide, antimony oxide and iron oxide in various proportions, close to those for making an electrically neutral pyrochlore, were intimately mixed using a Waring blender then fired, under argon or inert atmosphere, at temperatures within the range 1350° F. to 1700° F. The resulting products, after milling, exhibited a range of colors from very deep red-toned black to red-orange, the dominant or sole phase observed in their x-ray powder diffraction patterns was that of a pyrochlore. Color is darker in hue for the antimony containing example (54) than for the bismuth analog (53).

TABLE 10

Masses of Oxides Employed in Examples 42 to 54

| Oxides | 42 | 43 | 44 | 45 | 46 | 47 | 48 | 49 | 50 | 51 | 52 | 53 | 54 |
|---|---|---|---|---|---|---|---|---|---|---|---|---|---|
| $Bi_2O_3$ | 93.19 | 46.60 | 88.53 | 83.87 | 79.21 | 74.55 | 69.89 | 65.23 | 60.57 | 55.92 | 51.26 | 93.19 | 46.60 |
| $Sb_2O_3$ | 0.00 | 29.15 | 2.92 | 5.83 | 8.75 | 11.66 | 14.58 | 17.49 | 20.41 | 23.32 | 26.24 | 0.00 | 29.15 |
| $Fe_2O_3$ | 15.97 | 15.97 | 15.97 | 15.97 | 15.97 | 15.97 | 15.97 | 15.97 | 15.97 | 15.97 | 15.97 | 15.97 | 15.97 |
| $Nb_2O_5$ | 26.58 | 26.58 | 26.58 | 26.58 | 26.58 | 26.58 | 26.58 | 26.58 | 26.58 | 26.58 | 26.58 | 26.58 | 26.58 |

Examples 55-63

Mixtures of oxides were made in the proportions exhibited in Table 11 and calcined, in air, to temperatures between 2000 and 2200° F. The resulting pigments, when ground and incorporated into an acrylate copolymer paint exhibited the characteristic color shown in Table 11.

TABLE 11

Elemental Proportions of and Color Exhibited by Examples 55-63

| Elements | 55 | 56 | 57 | 58 | 59 | 60 | 61 | 62 | 63 |
|---|---|---|---|---|---|---|---|---|---|
| Ce | 1.8 | 1.8 | 1.8 | 1.8 | 1.8 | | | | 1.8 |
| Ni | 0.2 | 0.2 | 0.2 | 0.2 | 0.2 | 0.2 | | | |
| Co | | | | | | | 0.2 | 0.2 | 0.2 |
| La | | | | | | | 1.8 | | |
| Nd | | | | | | 1.8 | | 1.8 | |
| W | | 0.1 | | | | | | | |
| Mo | 0.1 | | | | | | | | |
| Ta | | | 0.2 | | | | | | |
| Sb | | | | | | 0.2 | 0.2 | 0.2 | 0.2 |
| V | | | | 0.2 | | | | | |
| Ti | 1.9 | 1.9 | 1.8 | 1.8 | 1.8 | 1.8 | 1.8 | 1.8 | 1.8 |
| O | 7 | 7 | 7 | 7 | 7 | 7 | 7 | 7 | 7 |
| Color | Buff | Olive Green | Green Yellow | Brown | Yellow | Lavender | Pale Brown | Brown | Grey |

Examples 64-72

Mixtures of oxides were made in the proportions exhibited in Table 12 and calcined, in air, to temperatures between 2000 and 2200° F. The resulting pigments, when ground and incorporated into an acrylate copolymer paint exhibited the characteristic color shown in Table 12.

TABLE 12

Elemental Proportions used in Raw Batches for Examples 64-72 and the colors obtained.

| Elements | 64 | 65 | 66 | 67 | 68 | 69 | 70 | 71 | 72 |
|---|---|---|---|---|---|---|---|---|---|
| Nd | 1.8 | 1.8 | | | | | | | |
| Ni | 0.2 | | | | | | | | |
| Co | | | | | | 0.2 | 0.2 | 0.2 | 0.2 |
| Mn | | 0.2 | | | | | | | |
| La | | | 1.8 | 1.8 | 1.8 | 1.8 | 1.8 | 1.8 | 1.8 |
| Fe | | | 0.2 | 0.2 | 0.2 | | | | |
| W | | | | | | | | | |
| Mo | | 0.1 | | | | | | | |
| Ta | 0.2 | | | | | | | | 0.2 |
| Nb | | | 0.2 | | 0.2 | | 0.2 | | |
| Sb | | | | 0.2 | | 0.2 | | 0.2 | |
| Zr | | | 1.8 | 1.8 | 1.8 | 1.8 | | | |
| Si | 1.8 | 1.8 | 1.8 | | | | | | |
| Ti | 1.8 | 1.8 | | | | | | | |
| O | 7 | 7 | 7 | 7 | 7 | 7 | 7 | 7 | 7 |
| Color | Green | Brown | Yellow Brown | Dk. Yellow Brown | Brown-Yellow | Dk Grey | Dark Grey | Dk Brown | Black |

What is claimed is:

1. A pigment comprising a compound with the formula of $A_y A'_{y'} B_x B'_{x'} Z_p$; wherein:

$1.5 \leq y+y' \leq 2.5$; $0.5 \leq y \leq 2$; and $y > y'$;

$1.5 \leq x+x' \leq 2.5$; $0.5 \leq x \leq 2$; and $x > x'$;

$5 \leq p \leq 9$;

A and A' are elements having a valence of 1, 2, or 3, selected from the elements of groups 1, 2, 12, 13, 14, 15, and the first row of transition metals, excluding H, Pb, Cd, Hg, N, As, and Tl;

$A \neq A'$;

B and B' are elements having a valence of 3, 4, 5, or 6, selected from the elements of the first, second, or third row of transition metals, groups 13, 14, and 15, excluding V, C, Pb, and Tl;

$B \neq B'$;

Z is selected from O, F, N, a chalcogen, S, Se, hydroxide ion, and mixtures thereof.

2. The pigment of claim 1, wherein A is selected from Sn, Zn, boron, and Al.

3. The pigment of claim 1, wherein B and B' are selected from Sb, Nb, Ta, P, Sn, Ti, Zr, Hf, W, Mo, and mixtures thereof.

4. The pigment of claim 1, wherein the formal charge on A is +2, and the formal charge on B is +5.

5. The pigment of claim 1, wherein the formal charge on A is +3, and the formal charge on B is +4.

6. The pigment of claim 1, wherein the compound has a pyrochlore structure.

7. The pigment of claim 1, wherein the compound has a fluorite structure.

8. The pigment of claim 1, wherein the compound has a weberite structure.

9. The pigment of claim 1, wherein A is selected from a rare earth metal or mixtures thereof.

10. A pigment comprising a compound with the formula of $A_y A'_{y'} B_x B'_{x'} Z_p$; wherein:

$0.5 \leq y+y' \leq 2$, and $y > y'$;

$0.5 \leq x+x' \leq 2$, and $x > x'$;

$5 \leq p \leq 9$;

A and A' are elements having a valence of 1, 2, or 3, selected from the elements of groups 1, 2, 12, 13, 14, 15, and the first row of transition metals, excluding H;

$A \neq A'$;

B and B' are selected from elements having a valence of 3, 4, 5, or 6, selected from the elements of the first, second, or third row of transition metals, group 13, 14, and 15, excluding V, C, Pb, and Tl;

wherein either A comprises at least one of Al or boron, or B comprises P;

$B \neq B'$;

Z is selected from O, F, N, a chalcogen, S, Se, hydroxide ion, and mixtures thereof.

11. The pigment of claim 10, wherein A comprises an element selected from Sn, Zn, boron, and Al.

12. The pigment of claim 10, wherein B and B' independently comprise an element selected from Sb, Nb, Ta, P, Sn, Ti, Zr, Hf, W, Mo, and mixtures thereof.

13. The pigment of claim 10, wherein the formal charge on A is +2, and the formal charge on B is +5.

14. The pigment of claim 10, wherein the formal charge on A is +3, and the formal charge on B is +4.

15. The pigment of claim 10, wherein the compound has a pyrochlore structure.

16. The pigment of claim 10, wherein the compound has a fluorite structure.

17. The pigment of claim 10, wherein the compound has a weberite structure.

18. The pigment of claim 10, wherein A is selected from a rare earth metal or mixtures thereof.

* * * * *